United States Patent [19]

Witte

[11] 4,176,582

[45] Dec. 4, 1979

[54] TORQUE LIMITING NUT ASSEMBLY

[75] Inventor: Erwin C. Witte, Placentia, Calif.

[73] Assignee: Microdot Inc., Greenwich, Conn.

[21] Appl. No.: 876,653

[22] Filed: Feb. 10, 1978

[51] Int. Cl.² ............................................. F16B 31/02
[52] U.S. Cl. ...................................................... 85/61
[58] Field of Search ....................................... 85/61, 62

[56] References Cited

U.S. PATENT DOCUMENTS

| 2,685,812 | 8/1954 | Dmitroff | 85/61 |
| 3,425,314 | 2/1969 | Ohlson | 85/61 |
| 3,504,591 | 4/1970 | Christophersen | 85/61 |
| 3,709,087 | 1/1973 | Stone | 85/61 |

Primary Examiner—Francis K. Zugel
Attorney, Agent, or Firm—Harness, Dickey & Pierce

[57] ABSTRACT

A torque limiting nut assembly having a threaded nut member and a spring wrench member which are interconnected by a ratchet like construction in which the magnitude of final assembly torque is predetermined by the torque required to initiate ratcheting of the ratchet like construction and with the ratchet like construction defining a non ratcheting, positive engagement construction for disassembly torque whereby the threaded nut member can be removed.

7 Claims, 4 Drawing Figures

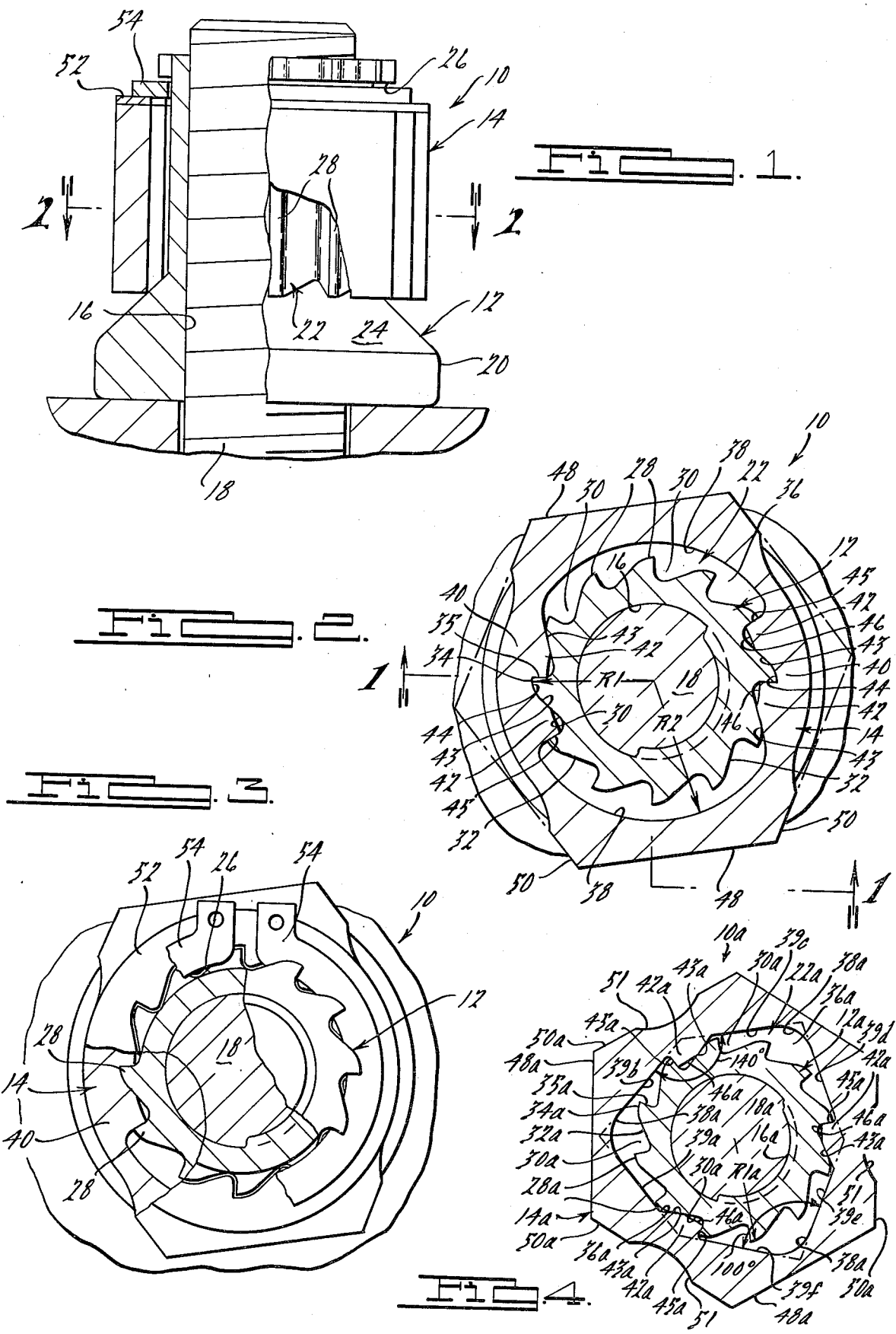

TORQUE LIMITING NUT ASSEMBLY

SUMMARY—BACKGROUND OF THE INVENTION

The present invention relates to threaded fasteners and more particularly threaded fasteners of the type having a torque limiting feature for limiting assembly torque.

There are many applications utilizing threaded fasteners in which it is desirable to limit the magnitude of assembly torque. In such cases this can be done by a suitable tool such as a torque wrench. Quite often, however, such tools are not readily available or their provision is impractical. In the present invention a threaded nut member is provided to have a ratchet construction with a separate wrenching member. Torque is applied to the nut member with a conventional wrench acting on the wrenching member. The ratcheting construction is set to permit assembly torque to a preselected magnitude at which point ratcheting is commenced thereby precluding the application of additional torque. The ratchet structure, however, ratchets in only one direction and in the opposite direction does not ratchet and hence permits the application of adequate reverse torque for removal. Thus assembly and disassembly can be provided by conventional tools.

Therefore, it is an object of the present invention to provide a new and improved nut assembly having a torque limiting feature whereby application torque can be preselected.

It is another object of the present invention to provide a new and improved nut assembly having a nut member body and wrenching member which are interconnected via a ratchet assembly whereby application torque is limited.

It is another object of the present invention to provide a nut assembly of the previously described type in which the ratchet assembly is operative to ratchet in one direction and not in the opposite direction whereby a reverse torque can be applied for removal of the nut assembly.

Other objects, features, and advantages of the present invention will become apparent from the subsequent description and the appended claims, taken in conjunction with the accompanying drawing, in which:

FIG. 1 is a front elevational view of a nut assembly of the present invention with some parts shown in section generally along the lines 1—1 of FIG. 2 and with other parts shown partially broken away;

FIG. 2 is a sectional view of the assembly of FIG. 1 taken essentially along the line 2—2 of FIG. 1;

FIG. 3 is a top elevational view of the nut assembly of FIGS. 1 and 2 with some parts shown in section and others shown partially broken away; and FIG. 4 is a sectional view similar to that of FIG. 2, and depicting a modified form of nut assembly.

Looking now to the drawing, a torque limiting nut assembly 10, includes a nut body 12 and a wrenching spring 14. The nut body 12 has an internally threaded bore 16 adapted to threadably receive a similarly threaded bolt 18 (only partially shown). An enlarged diameter base portion 20 is connected to an upper fluted portion 22 via a radially inwardly tapered portion 24. The fluted portion 22 has an annular groove 26 near its upper end, which groove serves a purpose to be described.

The fluted portion 22 has a plurality of equally circumferentially spaced, axially extending fingers 28 and grooves 30. For a right hand thread configuration the nut member 12 is adapted to be applied onto the bolt 18 by clockwise rotation. Thus each finger 28 has a ramp surface portion 32 which is inclined radially outwardly in a clockwise direction generally from the base of groove 30 to a generally non-inclined outer portion 34. The outer portion 34 can be arcuately formed to have a radius R1 generally from the center of the nut body 12. The opposite side 35 of each finger 28 is generally not inclined and extends radially outwardly generally from the base of groove 30 along a radius line from the center of the nut body 12.

The wrenching spring 14 is of a generally annular shape and is adapted to interfit with the fingers 28 and grooves 30 of nut body 12. The wrenching spring 14 has an enlarged oblong opening 36. The opening 36 has a pair of radially opposite arcuate portions 38 which are defined by a radius R2 from the center of the nut member 12. The radius R2 is sufficient to provide a clearance relationship with the fingers 28. In quadrature with the portion 38 are arcuate portions 40 which represent flattened portions being a shorter distance from the axis of nut member 12 than radius R2. The flattened portions 40 each have a pair of teeth 42 separated by a groove 44.

The teeth 42 have a shape generally similar with the grooves 30 on nut member 12 but with a depth slightly less than grooves 30. The intermediate grooves 44 have a shape similar to that of teeth 28 whereby the teeth 28 are matingly received therein. Thus as the wrenching spring member 14 is rotated clockwise to apply the nut member 12 onto the bolt 18 torque is transmitted via the application surfaces 43 of teeth 42 and mating, complementary ramp surfaces 32 of the associated fingers 28. Likewise removal torque is applied via the removal surfaces 45 of teeth 42 and the mating, complementary surfaces 35 of the associated fingers 28. Since the surfaces 45 and 35 are not inclined in the direction of removal rotation a positive drive is provided and non-ratcheting on removal is assured. The teeth 42 terminate in generally arcuate surfaces 46, which can generally matingly overengage the outer surfaces 34 of fingers 28 during ratcheting.

The wrenching spring 14 has a pair of diametrically opposite external flats 48 located generally in radial alignment with arcuate portions 38. Each of the flats 48 has abbreviated flat portions 50 extending from opposite sides thereof which flat portions 50 if extended fully would define a hexagonal outer periphery (as indicated in phantom) for a conventional hex nut configuration. The generally hexagonal, outer periphery defined by full flats 48 and partial flats 50 are of a size to be gripped by a conventional box wrench or open end wrench of a standard size.

Note that in a sense the abbreviated flats 50 are defined by the absence of material at flattened portions 40. These portions 40 are selected to be of a wall thickness along with the thickness of sections defined by arcuate section 38 whereby the wrenching spring member 14 acts like a spring and under a preselected torque will permit elastic expansion at the flattened portion 40 and contraction at arcuate sections 38. This occurs as the surfaces 43 of teeth 42 move up along the inclined surfaces 32 on fingers 28. Note that the arcuate surfaces 46 engage similar arcuate surfaces 34 whereby excessive wear and/or load concentrations are avoided during ratcheting. The wall thicknesses of sections 38 are selected along with the ramp angle of fingers 32 to provide a slipping or ratcheting action at a preselected torque. Thus, with this construction the application torque can be limited. For removal the surfaces 45 of teeth 42 matingly engage the complementary surfaces 35 of fingers 28 whereby ratcheting does not occur and a positive drive is provided for removal.

The wrenching spring member 14 has the opening 36 of a size to fit over the fluted portion 22 of nut member 12 with the teeth 42 and grooves 44 interfitting with grooves 30 and fingers 28, respectively. In order to axially retain the spring member 14 thereon an annular washer 52 generally of an outside diameter to extend to the flattened portions 40 is located on the upper end of spring member 14. The inside diameter of washer 52 generally matches the contour of the fingers 28 and grooves 30 of nut member 12 whereby the washer 52 can be slipped over the upper end of nut member 12. (See FIG. 3). A "C" type clip or retaining ring 54 is located over the washer 52 and fits in the groove 26 to positively retain the spring member 14 and washer 52 onto the nut member 12.

The assembly torque can be set by adjusting the ramp angle of surface 32, the relative depth of teeth 42 and the relative length of the engaging mating surfaces. In addition the assembly torque can be further set by adjusting the wall thicknesses of the arcuate portions 40 and 38. In this manner the assembly torque can be set to a preselected desired magnitude at which ratcheting will occur and over torque or under torque can be avoided. Removal is provided as noted and the nut assembly 10 can be reapplied.

Looking now to FIG. 4 a modified form of torque limiting nut assembly is shown. In the description of the modified form components similar to like components in the embodiment of FIGS. 1-3 are given the same numerical designation with the addition of the letter postscript "a".

Thus a torque limiting nut assembly 10a, includes a nut body 12a and a wrenching spring 14a. The nut body 12a (identical to nut body 12 of FIGS. 1-3) has an internally threaded bore 16a adapted to threadably receive a similarly threaded bolt 18a.

As with nut body 12, nut body 12a has a fluted portion 22a having a plurality of equally circumferentially spaced, axially extending fingers 28a and grooves 30a. For a right hand thread configuration the nut member 12a is adapted to be applied onto the bolt 18a by clockwise rotation. Thus each finger 28a has a ramp surface portion 32a which is inclined radially outwardly in a clockwise direction generally from the base of groove 30a to a generally non-inclined outer portion 34a. The outer portion 34a can be arcuately formed to have a radius R1a generally from the center of the nut body 12a. The opposite side 35a of each finger 28a is generally not inclined and extends radially outwardly generally from the base of groove 30a along a radius line from the center of the nut body 12a.

The wrenching spring 14a is of a generally annular shape and is adapted to interfit with the fingers 28a and grooves 30a of nut body 12a. The wrenching spring 14a has an enlarged generally hexagonally shaped opening 36a defined by flats 39a-f. Alternate pairs of flats 39a, b and 39c, d and 39e, f are connected by arcuate portions 38a. Each of the other alternate pairs of flats 39b, c and 39d, e and 39f, a define, at their intersections, a tooth 42a.

The teeth 42a have a shape generally similar to the grooves 30a on nut member 12a but with a depth slightly less than grooves 30a. Thus as the wrenching spring member 14a is rotated clockwise to apply the nut member 12a, onto the bolt 18a torque is transmitted via the application surfaces 43a of teeth 42a and mating, complementary ramp surfaces 32a of the associated fingers 28a. Likewise removal torque is applied via the removal surfaces 45a of teeth 42a and the mating, complementary surfaces 35a of the associated fingers 28a. Since the surfaces 45a and 35a are not inclined in the direction of removal rotation, a positive drive is provided and non-ratcheting on removal is assured. The teeth 42 terminate in generally arcuate surfaces 46a, which can generally matingly overengage the outer surfaces 34a of fingers 28a during ratcheting.

The wrenching spring 14a has alternate external flats 48a located generally in radial alignment with arcuate portions 38a. Adjacent alternate flats 50a are located generally in radial alignment with the teeth 42a. The hexagonal outer periphery defined by flats 48a and flats 50a is of a size to be gripped by a conventional box wrench or open end wrench of a standard size.

The flats 50a are provided with arcuate portions 51 which extend radially inwardly at the associated ones of the teeth 46a and provide reduced sections thereat. In a similar manner the arcuate portions 38a define reduced sections with associated ones of the flats 48a. In this regard it should be noted that the generally hexagonal opening 36a is somewhat distorted since the associated pairs of flats 39a, b and 39c, d and 39e, f define angles less than 120°, i.e. in a preferred form the angle was around 100°, while the alternate associated pairs of flats 39b, c and 39d, e and 39f, a define angles greater than 120°, i.e. around 140°, in the noted preferred form. Thus the reduced sections at arcuate portions 38a and flats 48a and arcuate portion 51 and teeth 46a are selected to define wall thicknesses whereby the wrenching spring member 14 acts like a spring and under a preselected torque will permit elastic expansion at the flats 50a and teeth 46a and contraction at flats 48a and arcuate sections 38a. This occurs as the surfaces 43a of teeth 42a move up along the inclined surfaces 32a on fingers 28a. Note that the arcuate surfaces 46a engage similar arcuate surfaces 34a whereby excessive wear and/or load concentrations are avoided during ratcheting. The above noted wall thicknesses are selected along with the ramp edge of fingers 32a to provide a slipping or ratcheting action at a preselected torque. Thus, with this construction the application torque can be limited. For removal the surfaces 45a of teeth 42a matingly engage the complementary surfaces 35a of fingers 28a whereby ratcheting does not occur and a positive drive is provided for removal. It should be noted that the distorted hexagonal shape of opening 36a facilitates the development of teeth 42a and of the reduced thickness portions discussed above.

The wrenching spring member 14a has the opening 36a of a size to fit over nut member 12a with the teeth 42a interfitting with grooves 30a and fingers 28a. The spring member 14a can be retained onto the nut member 12a in the same manner as members 12 and 14 of FIGS. 1-3.

The assembly torque can be set by adjusting the ramp angle of surface 32a, the relative depth of teeth 42a, and the relative length of the engaging mating surfaces. In addition the assembly torque can be further set by adjusting the wall thicknesses at arcuate portions 38a and 51. In this manner the assembly torque can be set to a preselected desired magnitude at which ratcheting will occur and over torque or under torque can be avoided. Removal is provided as noted and the nut assembly 10a can be reapplied.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A torque limiting nut assembly comprising: a threaded nut member, a wrenching member having an external surface adapted to be engaged by a wrench and having a central opening adapted to receive said threaded nut member, said threaded nut member having a plurality of axially extending fingers circumferentially disposed about its outer surface, each of said fingers having a ramp on one side defined by a radially extending surface inclined radially outwardly in the direction of rotation for application of said nut member onto an associated bolt member, said wrenching member having at least one tooth extending from three generally equiangularly spaced sides of said central opening, each said tooth having a ratchet surface generally similar to that of said ramp and being engageable therewith, said wrenching member being of a resilient construction and permitting elastic deformation of said central opening, said wrenching member having a plurality of external flats defining a generally hexagonal outer surface adapted to be gripped by a wrench and with alternate ones of said flats being generally in radial alignment with an associated one of each said tooth, said alternate ones of said flats having recesses extending radially inwardly at said associated one of each said tooth to define areas of preselected reduced sections, whereby each said tooth can ratchet over said fingers with said central opening expanding in the area of each said tooth at a preselected torque on said wrenching member.

2. The nut assembly of claim 1 with said wrenching member having said central opening generally defining a hexagonal shape and being of a size to be in clearance relationship with said fingers in the areas adjacent each of said tooth.

3. The nut assembly of claim 2 with said opening being flattened in the areas of each said tooth whereby associated pairs of surfaces define an angle greater than 120° and with said opening in the areas alternate with each said tooth defining an angle less than 120°.

4. The nut assembly of claim 1 with said nut member having an enlarged base for axially retaining said wrenching member in one axial direction and having an annular groove and a retaining ring located therein at the opposite end of said nut member for retaining said wrenching members in an opposite axial direction.

5. The torque limiting nut assembly comprising: a threaded nut member, a wrenching member having an external surface adapted to be engaged by a wrench and having a central opening adapted to receive said threaded nut member, said threaded nut member having a plurality of axially extending fingers circumferentially disposed about its outer surface, each of said fingers having a ramp on one side defined by a radially extending surface inclined radially outwardly in the direction of rotation for application of said nut member onto an associated bolt member, said central opening being generally hexagonal in shape and having at least one tooth extending from alternate corners of said central opening, said central opening being of a size to be in clearance relationship with said fingers in the areas adjacent each of said tooth, each said tooth having a ratchet surface generally similar to that of said ramp and being engageable therewith, each said tooth and each said fingers terminating at their radial extremities in similarly shaped substantially non-inclined surfaces, each said tooth and each said fingers having complementary non-ratcheting surfaces opposite said ramp and said ratchet surface whereby said nut member can be removed upon application of disassembly torque, said wrenching member having a generally hexagonal outer surface defined by a plurality of external flats and adapted to be gripped by a wrench, each of said tooth being in radial alignment with an alternate one of said flats with each said alternate one of said flats having a radially inwardly extending recess defining a resilient reduced section, each of the others of the corners of said central opening adjacent said alternate corners being generally arcuately shaped and in radial alignment with one of the others of said external flats adjacent said alternate flats to define a different resilient section, said resilient section and said different resilient section providing for said wrenching member a resilient construction permitting elastic deformation of said central opening whereby each of said tooth can ratchet over said fingers with said central opening expanding in the area of each said tooth at a preselected torque on said wrenching member whereby ratcheting occurs and application torque is limited.

6. The nut assembly of claim 5 with said alternate corners defining an angle greater than 120° and with said others of the corners defining an angle less than 120°.

7. The nut assembly of claim 6 with alternate corners defining an angle of approximately 140° and with said others of the corners defining an angle of approximately 100°.

* * * * *